June 11, 1968 J. C. H. DAVIS 3,388,219

ACTIVE FILTERS FOR ELECTRICAL SIGNALLING SYSTEMS

Filed April 7, 1964 2 Sheets-Sheet 1

INVENTOR
John Christopher Hammond Davis

BY
[signature]
ATTORNEY

ACTIVE FILTERS FOR ELECTRICAL SIGNALLING SYSTEMS

Filed April 7, 1964 2 Sheets-Sheet 2

INVENTOR

John Christopher Hammond Davis

BY

Dennis Steinberg

ATTORNEY

United States Patent Office 3,388,219
Patented June 11, 1968

3,388,219
ACTIVE FILTERS FOR ELECTRICAL SIGNALLING SYSTEMS

John Christopher Hammond Davis, Taplow, England, assignor to British Telecommunications Research Limited, Taplow, England, a British company Filed Apr. 7, 1964, Ser. No. 358,012
Claims priority, application Great Britain, Apr. 8, 1963, 13,921/63
7 Claims. (Cl. 179—15)

ABSTRACT OF THE DISCLOSURE

In a pulse amplitude modulation time division multiplex signalling system, an active filter is used to suppress unwanted frequency components which occur round about multiples of the pulse recurrent frequency. A transistor gate which is opened by regularly occurring sampling pulses is so arranged that when open, it permits the signal to be applied to the base of a transistor so as to control current flowing in the emitter circuit of such transistor to effect a charging of a capacitor to a value corresponding to the value of the signal. The capacitor controls an output in accordance with its state of charge which is maintained until the next sampling pulse is received whereupon it is discharged if its state of charge exceeds that corresponding to the value of the signal when such next sampling pulse is received.

Figure 1:
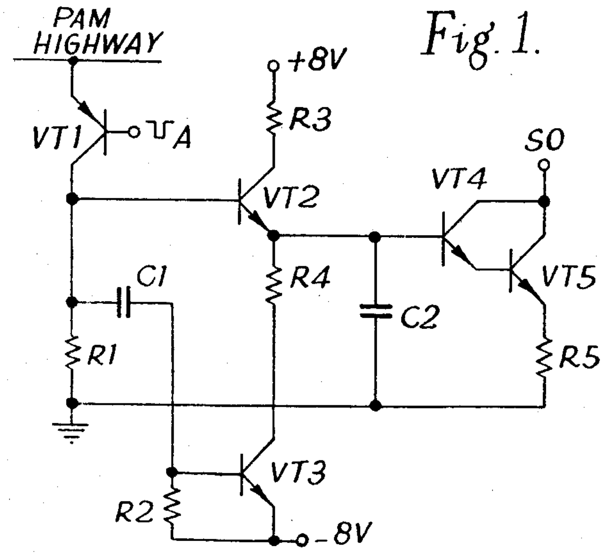

The present invention relates to active filters for use in electrical signalling systems employing a pulse sampling technique, and it is particularly applicable to systems operating on a pulse-amplitude-modulation basis which may include a pulse code modulation stage. Such systems will in most cases be of the time division multiplex type though this is not essential.

In systems of this type the usual arrangement is that the information for a given channel is carried by amplitude-modulating a succession of regularly recurring pulses whose repetition rate may be of the order of 8,000 c./s., particularly when the information concerned is speech, since the requirement is that the sampling frequency should be at least twice as great as the highest modulation frequency. This assumes that for satisfactory commercial speech the upper frequency limit need be no higher than 4,000 c./s. Since however direct speech waveforms, for instance as obtained from a microphone, will in fact include frequencies higher than this, it is important that such frequencies should be suppressed by the use of a suitable low-pass filter, otherwise the sampling technique will produce an appreciable amount of unwanted noise.

Where the number of channels is large, the duty ratio may be as high as 200:1, that is to say the proportion of the total time during which a pulse is present is $1/200$. Accordingly there is very little power available in these pulses and as a matter of circuit convenience they may include a steady D.C. However, if this is done the so-called "pedestal" will produce a series of carrier frequencies in multiples of the sampling frequency and the lowest of these needs to be severely attenuated if it is not to be audible. Moreover the rest of the modulated power forms side-bands round these carriers, the lowest side-bands containing almost as much power as the wanted audio. Accordingly some form of filtering is needed also at the receiving end to reduce the carriers and side-bands to inaudible levels and to prevent over-loading of the final amplifier.

The necessary effect may be produced by the use of conventional filters, but these tend to be somewhat bulky and moreover require the use of components of fairly accurate values. The chief object of the invention is to provide suitable filter devices in which the values of the components are not critical and the filter by the use of solid-state devices can be produced in an extremely compact form. It will be clear that where the number of channels is large, the number of filters is also large, and hence any reduction in the size of the filters has a cumulative effect.

According to one feature of the invention, in an active filter for reducing unwanted frequency components which occur round about multiples of the pulse recurrence frequency of a pulse-amplitude-modulated signal, the signal is applied to one or more gates responsive to regularly occurring sampling pulses each gate when open controlling a semi-conductor device to effect the setting of a storage device which is also arranged to be reset at the pulse recurrence frequency whereby an output signal is obtained from the filter which has a value proportional to the pulse-amplitude-modulated signal during a sampling period and remains at substantially the same value until the next sampling period.

According to another feature of the invention, in an active filter for use at the junctions of a pulse and an analogue signalling system, between successive pulses an incoming signal is effective to charge a capacitor by way of a transistor, a discharge circuit being completed for the capacitor at the pulse recurrence frequency whereby an output is obtained from the filter which has a steady value corresponding to the signal throughout the period between successive pulses.

Figure 2:
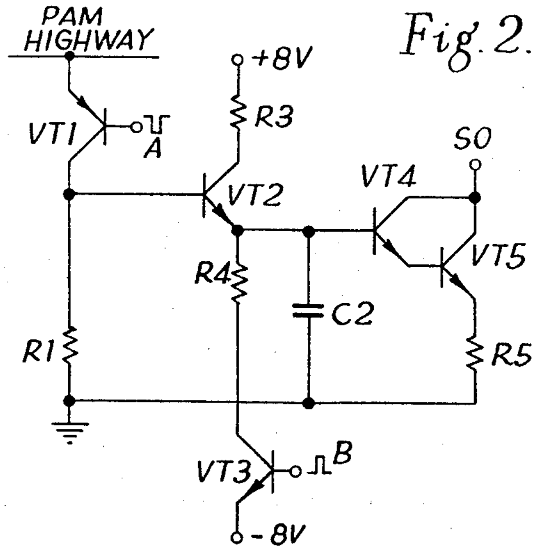
Figures 3, 4, 5, 6:
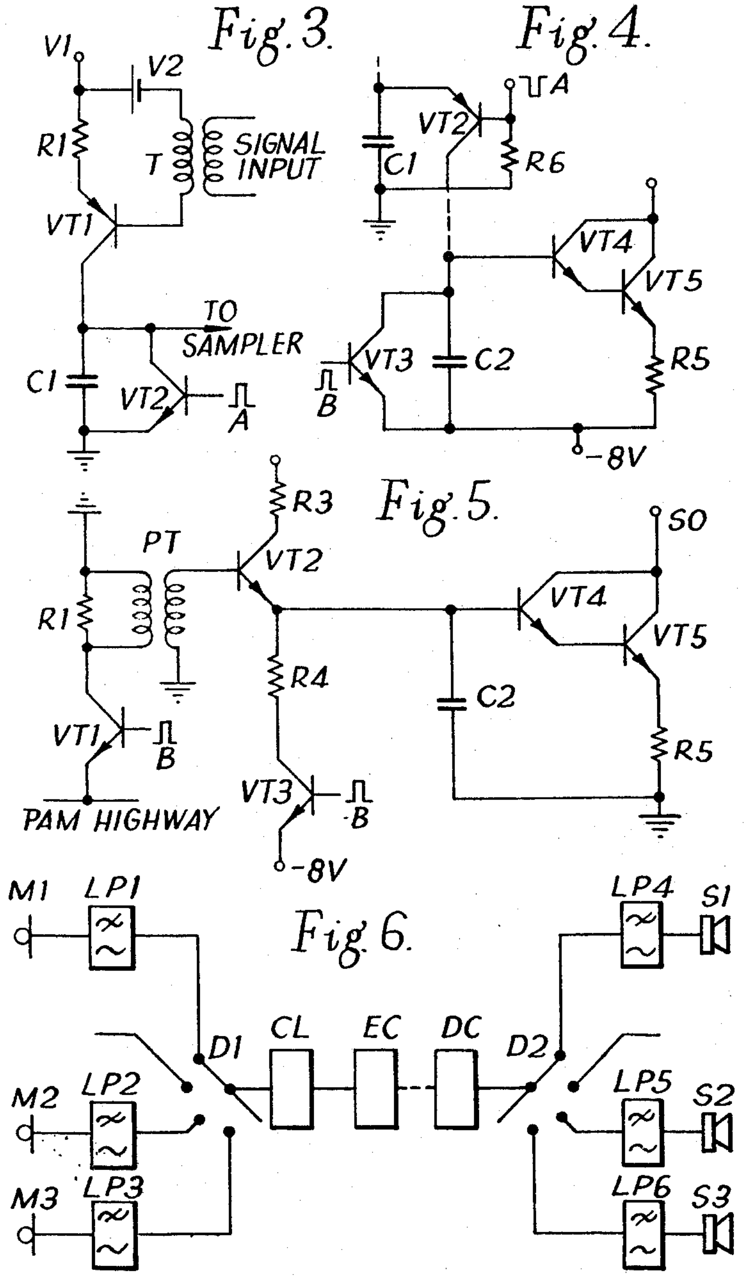

The invention will be better understood from the following description of several alternative methods of carrying it into effect which should be taken in conjunction with the accompanying drawings comprising FIGURES 1–6. FIGURES 1, 2 and 5 show possible circuit arrangements suitable for use at the incoming end of a so-called PAM highway, that is the common channel used for the transmission of a plurality of pulse-amplitude-modulated signals on a time division multiplex basis. The circuit of FIGURE 3 represents a filter according to the invention for use at the outgoing end of a PAM highway, and FIGURE 4 shows diagrammatically a scheme using the charge of a capacitor for conveying the required information, while FIGURE 6 shows diagrammatically a typical arrangement of a signalling system of the type in question which includes a pulse code modulation stage also.

Referring first to FIGURE 6, this shows in diagrammatic form the elements of a time division multiplex system using pulse code modulation and providing four channels, but this number is quite arbitrary and in practice a considerably larger number would almost certainly be used. It is assumed that it relates to the transmission of speech which may be provided from the audio inputs represented by the microphones M1, M2 and M3. These feed the low-pass filters LP1, LP2 and LP3 respectively, and the outputs from the filters are supplied to the distributor or channel selector D1. This is shown conventionally as a rotary switch but in practice use would preferably be made of a series of electronic gates which are opened in turn by suitable pulse waveforms.

The common transmission channel from the distributor extends to clamp CL which may be of any type known in the art, and serves to maintain the sample constant while it is being encoded by the encoder EC. This also may be of a known or suitable type. This encoding operation as is well known comprises an analogue-to-digital conversion, that is expressing the level or amplitude of the sample as a numerical value. The encoding law need not be and preferably is not linear. From the encoder the information is transmitted over the line L to the decoder DC, and signals now again in analogue form are then extended to the distributor or channel selector D2 whereby they are distributed in turn to different receiving channels by way of the low-pass filters LP4, LP5 and LP6. These are assumed to be associated respectively with transducers S1, S2 and S3 whereby the electrical energy is reconverted into audio energy in the form of speech. It will be appreciated that in practice the circuits will probably include automatic switching equipment whereby a particular sending station is associated with a particular receiving station, but this will be apparent to those skilled in the art and has not been specifically shown in order to avoid complicating the drawing.

Referring now to FIGURE 1, this represents an active filter such as might be represented by LP4, LP5 or LP6 and it is assumed moreover that it is being employed in a PAM system in which case since the signals do not undergo an analogue-to-digital conversion and vice versa at the receiving end, the encoder and decoder of FIGURE 6 will not be required. The basic feature of FIGURE 1 according to the invention is the use of a capacitor C2 which in effect forms a clamp to retain the signal thereon substantially unaltered between the sampling periods. Accordingly, during each of these interval periods a substantially constant potential is held on the base of transistor VT4 and this transistor, together with VT5, forms an audio-amplifier with a high input impedance and giving the required audio output at terminal SO from the collectors. The transistor VT1 constitutes a switching gate forming one element of the distributor D2 of FIGURE 6 whereby this particular channel is rendered momentarily effective.

Between the sampling pulses when transistor VT1 is non-conducting, the bases of the transistors VT2 and VT3 are held at earth and −8 volts respectively, and in view of the other circuit conditions, they also are non-conducting. When a negative-going channel selecting or sampling pulse is applied to the base of transistor VT1 corresponding to the sampling period as indicated in FIGURE 1, this transistor conducts and the leading edge of the pulse produced passes through capacitor C1 and causes transistor VT3 to conduct for a period which is arranged to be less than the total length of the sampling pulse. As a result capacitor C2 is discharged sufficiently to take it in the general case from its most positive to its most negative potential within the design requirements of the system, but it will happen in particular cases that some relaxation is possible. As capacitor C1 ceases to take current, the potential across R1 builds up to its full value representing the amplitude of the PAM pulse and the base of VT2 is adjusted accordingly. At a suitable point, transistor VT2 starts conducting and thereafter supplies the current required by transistor VT3 and also charges capacitor C2 to a potential which is determined by that across resistor R1. Resistors R3 and R4 serve to limit the maximum currents in VT2 and VT3. Ideally the adjustment of the potential of C2 is effected extremely rapidly so that it follows the audio waveform in a series of square steps, the verticals of which are at the instants when the channel selecting pulses are effective. In this case the resultant wave contains none of the carrier frequencies which are present in the pedestal currents delivered by VT1. In practice the steps will have slightly sloping treads corresponding to the presence of residual but much-reduced carriers.

FIGURE 2 shows an alternative form in which control of the operation of transistor VT3 is effected by a separate waveform and capacitor C1 may be omitted. The circuit moreover requires two switching waveforms A and B which are the inverse of one another in the ideal case. In practice however it may be preferable to end the switching action at B before that at A so as to ensure that the capacitor C2 is not discharged by some uncontrolled amount after transistor VT1 has been switched off. If it is inconvenient to provide two separate waveforms A and B, which may mean the provision of a good deal of extra wiring, the B waveform may be used to drive another transistor which acts as an inverter so that its output can be used to drive VT1 in place of waveform A. The general method of operation is otherwise the same as that of the FIGURE 1 arrangement, and therefore will not be traced through in detail. It may be mentioned that it is not essential that the A and B pulses should be exactly coincident and they may be displaced in phase to some extent provided they appear at the same repetition intervals.

A further alternative is illustrated in FIGURE 5. It will be noted that in the FIGURES 1 and 2 arrangements while all the transistors VT2–VT5 are of the npn type, transistor VT1 is of the pnp type. If however it is possible to effect pulse inversion, the transistor VT1 also may be of the npn type and can then be controlled to give the required results by the B pulse. With this arrangement therefore, the advantages are obtained that all the transistors are of the same type and only a single pulse waveform is required.

The necessary modification of the circuits is shown in FIGURE 5 where use is made of a pulse transformer PT having its primary shunted round resistor R1 and its secondary controlling the base of transistor VT2. The remainder of the circuit is as in FIGURE 2.

FIGURE 3 shows an arrangement suitable for employment at the input end of the system and thus corresponds to the low-pass filters LP1, LP2 and LP3, each of which is associated with an individual channel. As shown, a current normally flows in the base-emitter circuit of the transistor VT1 by way of the resistor R1 and the current source V2, and this is modulated by way of the secondary of transformer T, the primary of which may be connected to a suitable microphone with or without the intermediary of an amplifier. The resultant current in the collector circuit of VT1 continually charges capacitor C1 to a potential which is sampled at a suitable rate in any convenient manner as indicated by the distributor D1, FIGURE 6. Immediately after any sample has been taken, capacitor C1 is discharged by the switching on of transistor VT2 due to the positive-going pulse A. This discharge time is assumed to be short compared with the sampling period, and it will be appreciated that the pulse A is synchronised with the sampling action of the distributor D1. It will be seen that if the signal input frequency is low compared with the sampling rate, the potential reached by C1 is proportional to the mean value during the period between samples and is almost independent of frequency. If a high frequency is added to this, the mean effect of any cycles completed during the sampling period is zero. It can be shown that this produces a sin $x/x$ frequency characteristic with the first zero at the sampling frequency and this gives the desired filtering action.

It will be appreciated that the potential on capacitor C1 is proportional to its charge. Accordingly, any system of sampling which transfers the charge on the capacitor to a receive demodulator giving an output proportional to charge, gives an effect similar to the voltage control system described above. It also dispenses with the need at the transmitting terminal for a separate discharge arrangement as provided by VT2 in FIGURE 3.

FIGURE 4 shows by way of example a part of such an arrangement. Transistor VT2 located at the transmitting end and corresponding to VT2 in FIGURE 3 is normally non-conducting due to the potential developed across R6 connected to its base in consequence of the positive value of the waveform A. During the sampling period, this waveform falls to earth potential and the transistor VT2 then conducts and the stored charge on capacitor C1 is delivered to the highway system by way of the collector of VT2. The precise manner in which this is done is not shown in FIGURE 4 but various possibilities will occur to those skilled in the art.

At the receiving end, during the sampling period the charge is built up on capacitor C2 which holds this charge for most of the period between the samples until it is discharged by the shunting effects of transistor VT3 when conducting. This takes place due to the waveform B just prior to the time when the next sample is received. The signal output represented by the charge on capacitor C2 is delivered to the high input impedance amplifier represented by the transistors VT4 and VT5 and resistor R5. If the total time taken to discharge and charge capacitor C2 is small compared with the sampling period, the system has the combined frequency rejection properties of the input and output circuits shown in FIGURES 1, 2 and 3.

It will be appreciated that though a capacitor is probably most convenient to use as a storage device, the advantages of the invention are obtained if other forms of storage device, for instance an inductor, are made use of.

It will be understood also that the examples given show only simply ways of obtaining filtration. At the expense of some further complication, different filter characteristics can be obtained, for example as already pointed out the clamp at the output of a TDM system gives horizontal steps. By storing the information from two successive samples, it is possible to replace the steps forming two sides of a triangle by a line which takes a more direct route and thus gives better filtering.

I claim:

1. For use at the sending end of a time division multiplex system making use of pulse amplitude modulation, an active filter in which direct current flowing in the base-emitter circuit of a transistor is modulated by a signal in one of the time division multiplex channels and a capacitor in the collector circuit is charged to a corresponding potential, arrangements being provided for discharging the capacitor immediately following each channel pulse period whereby the potential of the capacitor when this pulse occurs is proportional to the mean value of the signal during the period since the previous channel pulse.

2. An active filter for reducing unwanted frequency components which occur round about multiples of the pulse recurrence frequency of a pulse amplitude modulated signal, comprising a capacitor which provides an output in accordance with its state of charge, a first transistor so connected that the current flow in the emitter circuit thereof is effective to charge said capacitor, a gate arranged to have the pulse amplitude modulated signal applied thereto and to be controlled by regularly occurring sampling pulses, such gate when open permitting a sample of the signal to be applied to the base of said first transistor, a circuit including a second transistor arranged to discharge said first capacitor and a second capacitor arranged to be charged directly by said sample and to control said second transistor whereby said discharge circuit is completed simultaneously with the application of said sample to said first transistor so that said first capacitor very rapidly attains a state of charge responding to said sample.

3. In an electrical signalling system employing pulse amplitude modulation, an active filter arranged to reduce unwanted frequency components which occur round about multiples of the pulse recurrence frequency, said filter comprising a capacitor arranged to control an output in accordance with its state of charge, a transistor so connected that the current flowing its emitter circuit is effective to charge the capacitor, a gate arranged to be controlled by regularly occurring sampling pulses and to have the pulse amplitude modulated signal applied thereto, said gate being arranged when opened to permit signals to be applied to the base of said transistor and a discharge circuit for said capacitor comprising switching means arranged to be opened to effect discharge of said capacitor substantially simultaneously with the occurrence of a sampling pulse to enable a capacitor to discharge if its state of charge exceeds that corresponding to the value of the signal.

4. A system as claimed in claim 3, in which the duration of the sampling pulse is arranged to exceed the time during which the discharge circuit is completed.

5. A system as claimed in claim 3, in which the switching means comprises a transistor and the system includes pulse supplying means arranged to supply timing pulses substantially coincident with said sampling pulses to operate said switching means.

6. A system as claimed in claim 5, in which said pulse supplying means comprises a further transistor arranged to invert said sampling pulses.

7. A system as claimed in claim 5, in which said pulse supplying means comprises a pulse transformer arranged to invert said sampling pulses.

References Cited

UNITED STATES PATENTS 2,961,537 11/1960 Turner ------------- 328—151

ROBERT L. GRIFFIN, *Primary Examiner.*

W. E. COOK, R. K. ECKERT, *Assistant Examiners.*